(12) United States Patent  
Chang et al.

(10) Patent No.: US 8,108,000 B2
(45) Date of Patent: Jan. 31, 2012

(54) ELECTRONIC DEVICE AND METHOD OF CONTROLLING THE ELECTRONIC DEVICE

(75) Inventors: Li-Ying Chang, Taipei Hsien (TW); Ming-Shiu Ou Yang, Taipei Hsien (TW); Kuan-Lin Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/417,659

(22) Filed: Apr. 3, 2009

(65) Prior Publication Data

US 2010/0056213 A1    Mar. 4, 2010

(30) Foreign Application Priority Data

Aug. 26, 2008  (CN) .................... 2008 1 02304207

(51) Int. Cl.
*H04M 1/00*  (2006.01)
*H04B 1/38*  (2006.01)

(52) U.S. Cl. ............. 455/556.1; 455/566; 455/173

(58) Field of Classification Search ........... 345/173, 345/156, 102, 169; 455/566, 418, 567, 41.3; 340/521, 815.4, 573.1, 156
See application file for complete search history.

(56) References Cited

U.S. PATENT DOCUMENTS

| 7,657,849 B2 * | 2/2010 | Chaudhri et al. | 715/863 |
| 2002/0080123 A1 * | 6/2002 | Kennedy et al. | 345/173 |
| 2008/0284748 A1 * | 11/2008 | Hsu et al. | 345/173 |

FOREIGN PATENT DOCUMENTS

WO    2008/035235 A1    3/2008

* cited by examiner

*Primary Examiner* — Kiet Doan
(74) *Attorney, Agent, or Firm* — Altis Law Group, Inc.

(57) ABSTRACT

An electronic device having a temperature sensor is provided. The temperature sensor detects information of a touch operation from an object on a surface of the temperature sensor, determines if the touch operation is valid by determining if the detected information meet preset standards, and executes a corresponding command to activate an action of the electronic device, in response to a determination that the touch operation is valid.

14 Claims, 4 Drawing Sheets

ELECTRONIC DEVICE AND METHOD OF CONTROLLING THE ELECTRONIC DEVICE

BACKGROUND

1. Technical Field

Embodiments of the present disclosure are related to device controlling systems and methods, and particularly to an electronic device and a method of controlling the electronic device.

2. Description of Related Art

Presently, electronic devices, such as personal digital assistants, mobile phones, or personal computers (PC), may provide interfaces, such as keyboards, touch screens, etc., for users to input commands to the electronic devices. To prevent responses induced by inadvertent operations, an electronic device may adopt a lock feature. When the electronic device needs to be used, the electronic device needs to be unlocked according to a preset unlock method. For example, two keys may have to be actuated within a preset time to unlock a mobile phone in a lock mode. However, the unlock method may be inconvenient for some people who are slow, for example, the elderly or the visually impaired.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
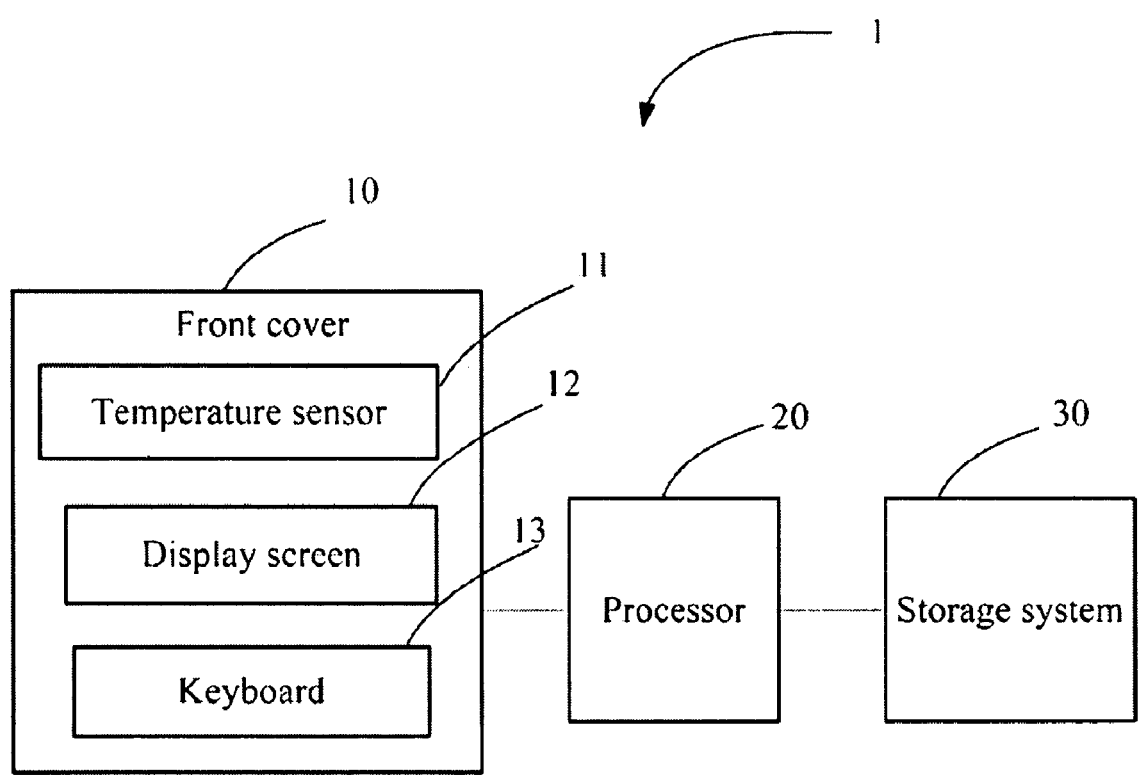
FIG. 1 is a block diagram of one embodiment of an electronic device.

FIG. 1 is a block diagram of one embodiment of an electronic device 1. In one embodiment, the electronic device 1 includes a front cover 10, a processor 20, and a storage system 30. The front cover 10 includes at least one temperature sensor 11 (only one shown), a display screen 12, and a keyboard 13. In other embodiments, the temperature sensor 11 may be set on a back cover or any other suitable location of the electronic device 1.

Figure 2:
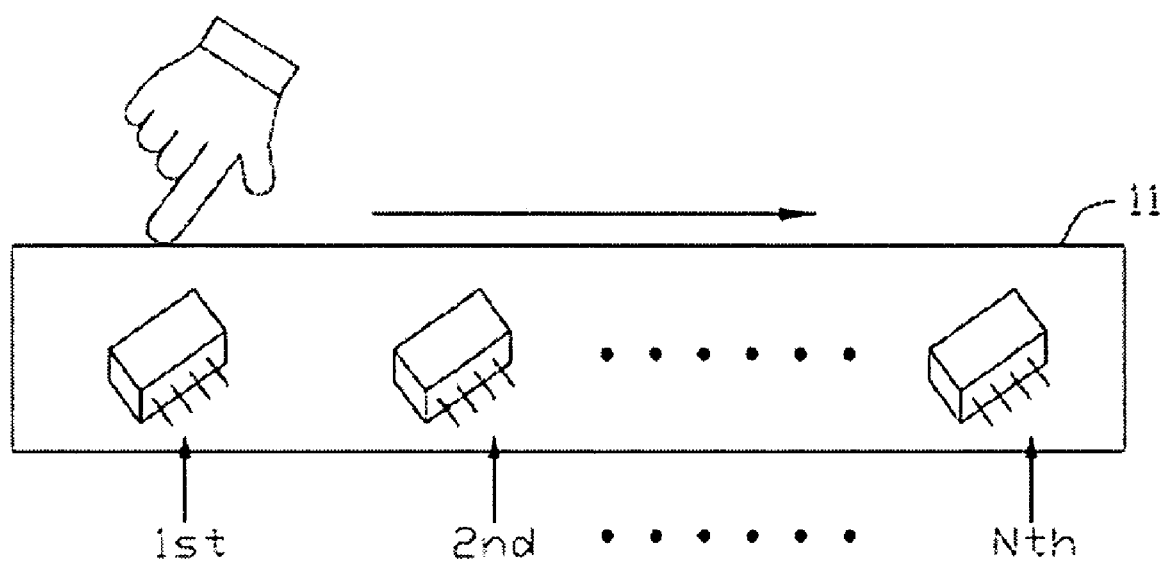
FIG. 2 is a block diagram of one embodiment illustrating arrangement of a temperature sensor of the electronic device in FIG. 1.
Figure 3:
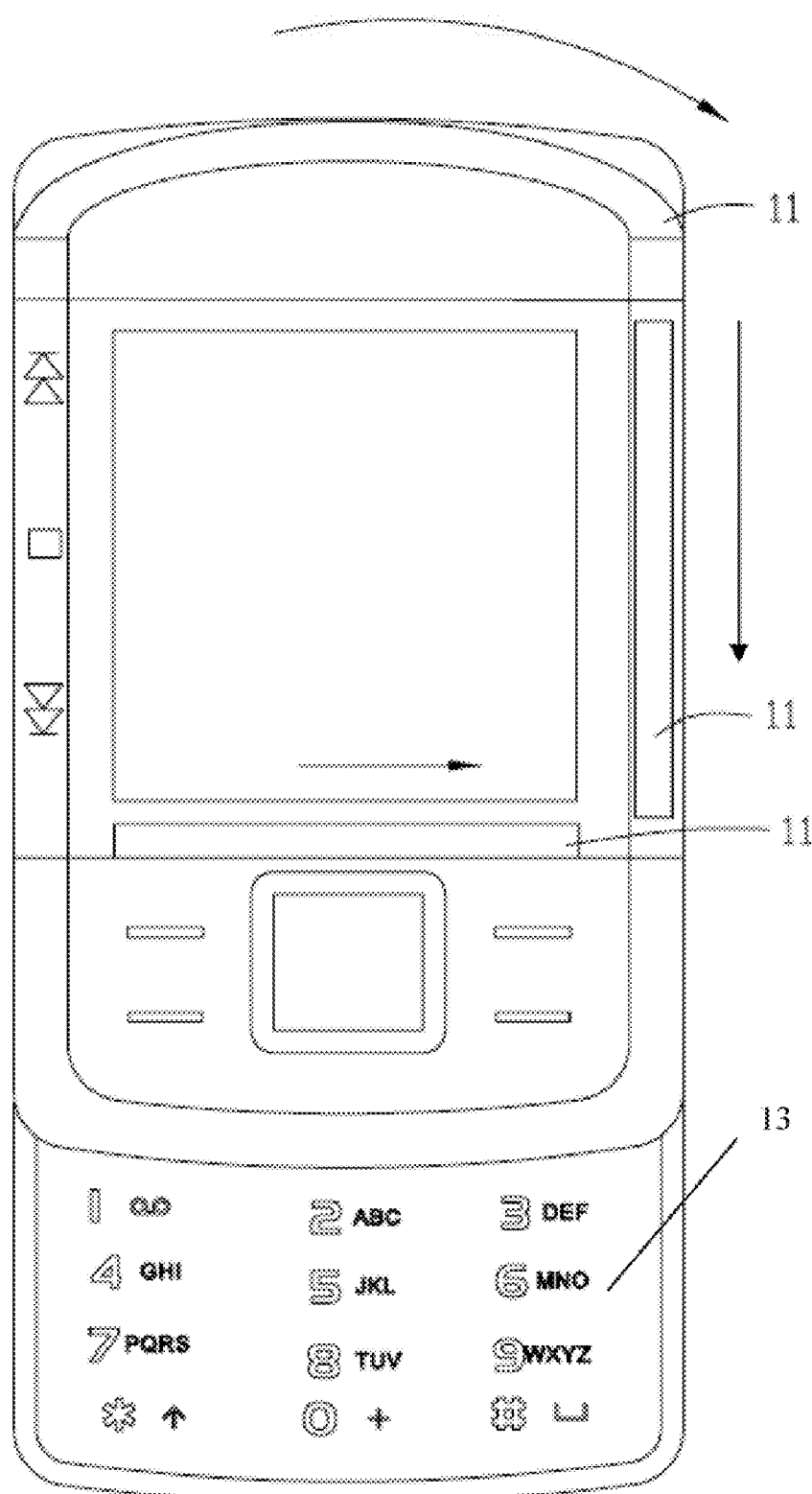
FIG. 3 is a block diagram of one embodiment illustrating a mobile phone comprising one or more temperature sensors.

The temperature sensor 11 comprises a plurality of temperature sensing units arranged in a predetermined manner. For example, as shown in FIG. 2, the plurality of temperature sensing units are arranged in a line. The plurality of temperature sensing units may be arranged as other forms, such as an arc. Depending on the embodiment, the electronic device 1 may be a mobile phone, a personal digital assistant or any other suitable device. For example, as shown in FIG. 3, the temperature sensor 11 may be configured to have any suitable outline, or may be set at any suitable location on the front cover 10 of a mobile phone, and may be configured to facilitate as an input key to invoke any predetermined functions of the mobile phone, such as unlocking the keyboard 13 of the mobile phone.

The temperature sensor 11 is configured for detecting a touch operation from an object, such as a finger touching the surface of the temperature sensor 11, detecting the temperature of the object via the plurality of temperature sensing units, and transmitting detected information to the processor 20.

The storage system 30 stores all kinds of data, such as programs of an operating system and other applications of the electronic device 1. The storage system 30 further stores predetermined standards for detecting if any touch operation on the surface of the temperature sensor 11 is a valid touch operation, and stores a command corresponding to the valid touch operation. In one embodiment, the predetermined standards include a predetermined sliding direction of a valid touch operation on the surface of the temperature sensor 11, a predetermined time range of time spent on passing through adjacent temperature sensing units by the valid touch operation, and a predetermined temperature range of the valid touch operation. Depending on the embodiment, the storage system 30 may be an external storage card, e.g., a smart media card, a secure digital card, a compact flash card, or any other type of memory card.

The processor 20 is configured for executing the programs in the storage system 30 to realize functions of the electronic device 1. Furthermore, the processor 20 is configured for comparing the detected information sent from the temperature sensor 11 with the predetermined standards stored in the storage system 30, in order to determine if the touch operation on the surface of the temperature sensor 11 is a valid touch operation, and for executing the command corresponding to the valid touch operation to activate a corresponding action of the electronic device 1, such as unlocking the keyboard 13, in response to a determination that the touch operation is a valid touch operation.

Figure 4:
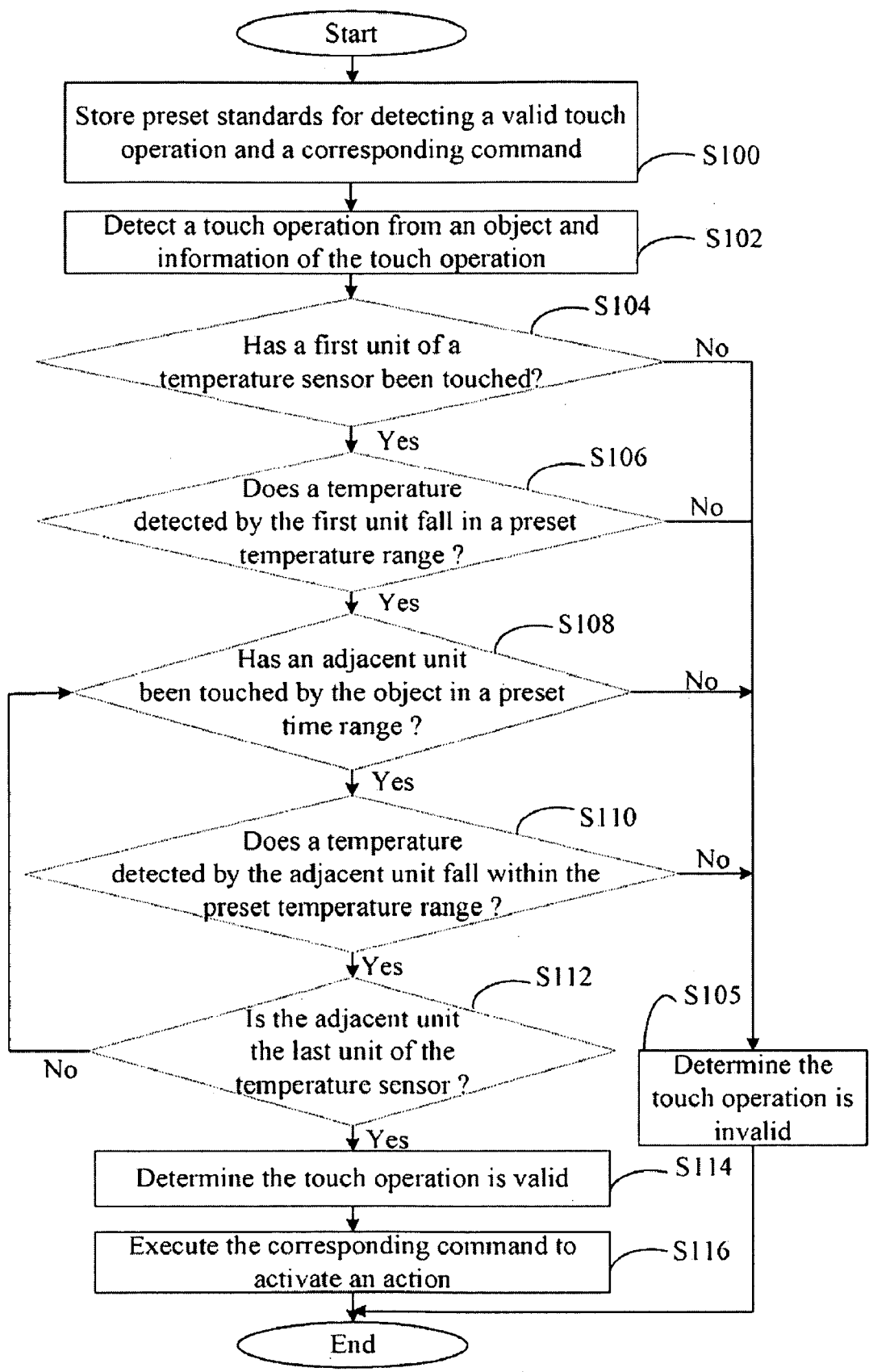
FIG. 4 is a flowchart of one embodiment of a method of controlling the electronic device having the temperature sensor.

FIG. 4 is a flowchart of one embodiment of a method of controlling the electronic device 1 having the temperature sensor 11. Depending on the embodiment, additional blocks may be added, others removed, and the ordering of the blocks may be changed. As mentioned above, the temperature sensor 11 consists of a plurality of temperature sensing units arranged in a predetermined manner.

In block S100, the processor 20 stores predetermined standards for detecting if any touch operation on the surface of the temperature sensor 11 is a valid touch operation, and stores a command corresponding to the valid touch operation into the storage system 30. As mentioned above, the predetermined standards include a predetermined sliding direction of a valid touch operation on the surface of the temperature sensor 11, a predetermined time range of the time spent on passing through adjacent temperature sensing units by the valid touch operation, and a predetermined temperature range of the valid touch operation. In one embodiment, the predetermined sliding direction is a left direction sliding on the surface of the temperature sensor 11.

In block S102, the temperature sensor 11 detects a touch operation from an object, such as a finger of a user, and detects a temperature of the object by the plurality of temperature sensing units.

In block S104, the processor 20 determines if a first temperature sensing unit has been touched by the object, by determining if a first temperature has been sent to the processor 20 from the first temperature sensing unit. If the first temperature sensing unit has not been touched by the object, the procedure goes to block S105, the processor determines the touch operation is an invalid touch operation. Otherwise, if the first temperature sensing unit has been touched by the object, the procedures goes to block S106.

In block S106, the processor 20 determines if the first temperature detected by the first temperature sensing unit falls within the predetermined temperature range, such as 36.0~37.0 degrees Celsius. If the first temperature does not fall within the predetermined temperature range, the procedure goes to block S105. In such a situation, the touch operation may be determined to have been performed by an invalid object, and not performed by a finger of a user. Otherwise, if the first temperature falls in the predetermined temperature range, the procedure goes to block S108.

In block S108, the processor 20 determines if an adjacent temperature sensing unit (e.g., a second temperature sensing unit positioned adjacent to the first temperature sensing unit) in the predetermined sliding direction has been touched by the object within the predetermined time range, such as 0.2~2 seconds, by determining if a next temperature has been received from the adjacent temperature sensing unit within the predetermined time range. If the adjacent temperature sensing unit has not been touched by the object in the predetermined time range, the procedure goes to block S105. In such a situation, the touch operation may be performed by a valid object (such as the palm of the hand) accidently, such that the touch operation on the temperature sensing units is discontinuous. Otherwise, if the next temperature sensing unit has been touched by the object in the predetermined time range, the procedures goes to block S110.

In block S110, the processor 20 determines if the next temperature falls within the predetermined temperature range, such as 36.0~37.0 degrees Celsius. If the next temperature does not fall within the predetermined temperature range, the procedure goes to block S105. Otherwise, if the next temperature falls within the predetermined temperature range, the procedures goes to block S112.

In block S112, the processor 20 determines if the adjacent temperature sensing unit is the last unit of the temperature sensor 11 in the predetermined sliding direction. If the adjacent temperature sensing unit is not the last unit of the temperature sensor 11, the procedure goes to block 108. Otherwise, if the adjacent temperature sensing unit is the last unit of the temperature senor 11 in the predetermined sliding direction, the procedure goes to block 114.

In block 114, the processor 20 determines the touch operation is a valid touch operation.

In block 116, the processor 20 executes the corresponding command stored in the storage 30 to activate an action of the electronic device 1, such as unlocking the keyboard 13.

The above embodiments apply the temperature sensor 11 on a cover (e.g. the front cover 10) of the electronic device 1, to detect touch information and temperature information of the object touched on the surface of the temperature sensor 11, determines if any touch operation is valid by determining if the touch information and the temperature information meet preset standards, and executes a corresponding command to activate certain action of the electronic device. The electronic device 1 having the temperature sensor 11 can prevent actions induced by accidental touch and facilitate users to operate the electronic device 1 effectively.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An electronic device, comprising:
   at least one temperature sensor comprising a plurality of temperature sensing units for detecting a touch operation on a surface of the temperature sensor from an object, and detecting information of the touch operation, wherein the detected information of the touch operation comprises time spent by the touch operation on passing through adjacent temperature sensing units;
   a storage system for storing predetermined information, wherein the predetermined information comprises predetermined standards for determining if any touch operation on the surface of the temperature sensor is a valid touch operation, and a command corresponding to the valid touch operation, the predetermined standards comprising a predetermined time range of the time spent by the valid touch operation on passing through adjacent temperature sensing units; and
   at least one processor that analyzes the detected information from the temperature sensor, compares the detected information with the predetermined standards to determine if the touch operation is a valid touch operation, and executes the command to activate a corresponding action of the electronic device, in response to a determination that the touch operation is a valid touch operation,
   wherein the predetermined standards further comprise a predetermined sliding direction of a valid touch operation on the surface of the temperature sensor, and a predetermined temperature range of the valid touch operation.

2. The electronic device of claim 1, wherein the temperature sensor is positioned on a front cover or a back cover of the electronic device.

3. The electronic device of claim 1, wherein the corresponding action is unlocking the electronic device.

4. The electronic device of claim 1, wherein the detected information further comprises a sliding direction of the touch operation on the surface of the temperature sensor, and a temperature of the touch operation detected by each of the temperature sensing units.

5. The electronic device of claim 1, wherein the plurality of temperature sensing units are arranged in a straight line or an arc.

6. The electronic device of claim 1, wherein the electronic device is a mobile phone or a personal digital assistant.

7. The electronic device of claim 1, wherein the storage system is selected from the group consisting of a smart media card, a secure digital card, and a compact flash card.

8. A method for controlling an electronic device, the method comprising:
   detecting, information of a touch operation from an object by a temperature sensor of the electronic device, wherein the temperature sensor comprises a plurality of temperature sensing units, and the detected information of the touch operation comprises time spent by the touch operation on passing through adjacent temperature sensing units;
   analyzing the detected information from the temperature sensor, comparing the detected information with predetermined standards stored in a storage system of the electronic device to determine if the touch operation is a valid touch operation, wherein the predetermined standards comprise a predetermined time range of the time spent by a valid touch operation on passing through adjacent temperature sensing units; and executing a predetermined command corresponding to the valid touch operation to activate a corresponding action of the electronic device, in response to a determination that the touch operation is a valid touch operation, wherein the predetermined standards further comprise a predetermined sliding direction of a valid touch operation on the surface of the temperature sensor, and a predetermined temperature range of the valid touch operation.

9. The method of claim 8, wherein the temperature sensor is positioned on a front cover or a back cover of the electronic device.

10. The method of claim 8, wherein the corresponding action is unlocking the electronic device.

11. The method of claim 8 wherein the detected information further comprises a sliding direction of the touch operation on the surface of the temperature sensor and a temperature of the touch operation detected by each of the temperature sensing units.

12. The method of claim 8, wherein the plurality of temperature sensing units are arranged in a straight line or an arc.

13. The method of claim 8, wherein the electronic device is a mobile phone or a personal digital assistant.

14. The method of claim 8, wherein the storage system is selected from the group consisting of a smart media card, a secure digital card, and a compact flash card.

* * * * *